(12) United States Patent
Hwang et al.

(10) Patent No.: US 8,638,818 B2
(45) Date of Patent: Jan. 28, 2014

(54) INTERFACE APPARATUS AND METHOD FOR TRANSMITTING AND RECEIVING MEDIA DATA

(75) Inventors: Sung-Oh Hwang, Gyeonggi-do (KR); Ji-Eun Keum, Gyeonggi-do (KR); Sung-Ryeul Rhyu, Gyeonggi-do (KR); Jae-Yeon Song, Seoul (KR); Kyung-Mo Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 230 days.

(21) Appl. No.: 13/090,735

(22) Filed: Apr. 20, 2011

(65) Prior Publication Data
US 2011/0255558 A1    Oct. 20, 2011

(30) Foreign Application Priority Data

Apr. 20, 2010  (KR) .................. 10-2010-0036180

(51) Int. Cl.
*H04J 3/24*  (2006.01)
*H04N 7/173*  (2011.01)

(52) U.S. Cl.
USPC ........................................ 370/474; 725/109

(58) Field of Classification Search
None
See application file for complete search history.

(56) References Cited

U.S. PATENT DOCUMENTS

| 5,652,749 | A | 7/1997 | Davenport et al. |
| 2002/0073205 | A1 | 6/2002 | Mostafa |
| 2004/0223547 | A1 | 11/2004 | Hung |
| 2006/0184790 | A1 | 8/2006 | Oliveira et al. |
| 2009/0003389 | A1 | 1/2009 | Joung et al. |
| 2009/0122714 | A1 | 5/2009 | Kato |
| 2013/0042287 | A1* | 2/2013 | Hong et al. ................... 725/109 |

FOREIGN PATENT DOCUMENTS

| JP | 8-321836 | 12/1996 |
| JP | 2004-505384 | 2/2004 |

OTHER PUBLICATIONS

Stefano Battista et al., "MPEG-4: A Multimedia Standard for the Third Millennium, Part 1", Siemens Corporate Research, 1999.
Michael Ransburg et al., "Generic Streaming of Multimedia Content", Proceedings of the Ninth IASTED International Conference, Internet and Multimedia Systems and Applications, Feb. 2-23, 2005.
J. van der Meer et al., "RTP Payload Format for Transport of MPEG-4 Elementary Streams", Network Working Group, Standards Track, Nov. 2003.

* cited by examiner

*Primary Examiner* — Clemence Han
(74) *Attorney, Agent, or Firm* — The Farrell Law Firm, P.C.

(57) ABSTRACT

An interface for providing a media service includes an encapsulation layer for encapsulating coded media data. The interface also includes a delivery layer for transmitting the encapsulated media data to another entity, and a control layer for controlling transmission of the media data.

13 Claims, 6 Drawing Sheets

INTERFACE APPARATUS AND METHOD FOR TRANSMITTING AND RECEIVING MEDIA DATA

PRIORITY

This application claims priority to an application entitled "Interface Apparatus and Method for Transmitting and Receiving Media Data" filed in the Korean Industrial Property Office on Apr. 20, 2010, and assigned Serial No. 10-2010-0036180, the contents of which are hereby incorporated by reference.

BACKGROUND OF THE INVENTION

1. Field of the Invention

The present invention generally relates to an apparatus and method for transmitting and receiving multimedia data, and more particularly to an interface apparatus and method for encapsulating various types of multimedia data and transmitting and receiving the encapsulated multimedia data between devices on a network aimed at multimedia transmission.

2. Description of the Related Art

For efficient transmission of various multimedia contents, MPEG (Moving Picture Experts Group) has developed a variety of standards, such as MPEG2 TS (Transport Stream) and MP4 systems and file formats. Further, standards organizations, such as IETF (Internet Engineering Task Force) and IEEE (Institute of Electrical and Electronic Engineers) 3GPP ($3^{rd}$ Generation Partnership Project), have developed a variety of protocols for transmission of various multimedia content on the Internet, and platform technologies for configuring a multimedia content use the MPEG standards.

As the trend toward convergence of broadcast and communication services has continued since 2000, an environment has emerged where various content and services must be transmitted through different networks. Further, due to advances in content compression and transmission technologies, and improvements in display performance (e.g. TV), users desire to use high-definition data at a lower cost.

In order to meet the above requirements, MPEG intends to develop a standard technology that enables efficient transmission of a high-definition multimedia content, converged transmission of various multimedia contents, and use of various networks in transmission of a multimedia content.

Figure 1:
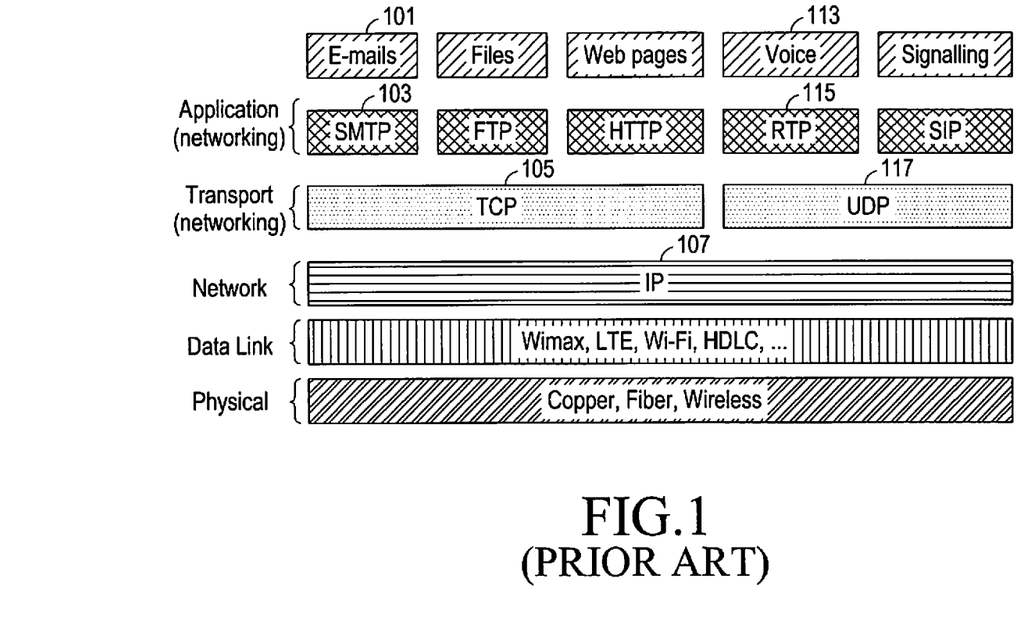
FIG. 1 illustrates a conventional protocol structure in which different protocols are used according to various application services.

FIG. 1 illustrates a conventional multimedia content transmission structure in which different protocols are used according to various multimedia content.

Referring to FIG. 1, each application (e.g. e-mail, file transfer, web service, etc.) is conventionally serviced in a corresponding layer by using a separate protocol. For example, an e-mail service 101 requires the SMTP protocol 103 in the application layer, requires the TCP protocol 105 in the transport layer, and requires the IP protocol 107 in the network layer. To the contrary, a voice service 113 requires the RTP protocol 115 in the application layer, and requires the UDP protocol 117 in the transport layer.

For example, assume that movie content is provided to a user. One frame constituting the movie content typically includes a video stream, an audio stream, and caption information. In the case of using the protocol structure of FIG. 1, the video stream, the audio stream, and the caption information must be transmitted using different protocols, as mentioned above. Therefore, when the conventional protocol structure is used, content including various types of media (hereinafter referred to as "multimedia content"), such as movie content, is inefficient to transmit. That is, in the method in current use for providing multimedia content, separate protocols must be applied according to respective media constituting each multimedia content, which results in inefficiency in multimedia content transmission. In particular, there is difficulty in transmission of complex multimedia content including various multimedia contents.

SUMMARY OF THE INVENTION

Accordingly, the present invention has been made to solve the above-mentioned problems occurring in the prior art, and an aspect of the present invention provides an apparatus and method for transmitting multimedia data including various types of multimedia content by using various types of networks.

Further, another aspect of the present invention provides an interface for integrated transmission of multimedia content.

Further, yet another aspect of the present invention provides a packet format for integrated transmission of multimedia content.

In accordance with an aspect of the present invention, there is provided an interface for providing a media service, the interface including an encapsulation layer for encapsulating coded media data; a delivery layer for transmitting the encapsulated media data to another entity; and a control layer for controlling transmission of the media data.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help the general understanding of the present invention, and it will be apparent to those skilled in the art that the present invention can be implemented without such definitions. Further, in the following description of the present invention, a detailed description of known functions and configurations incorporated herein will be omitted when it may make the subject matter of the present invention rather unclear.

The present invention defines an interface for integrated transmission and reception of multimedia content. The interface defined in the present invention provides three functional layers. A first functional layer is an encapsulation layer, a second functional layer is a delivery layer, and a third functional layer is a control layer.

The encapsulation layer processes and encapsulates various types of coded multimedia content received from a media coding layer. Further, the encapsulation layer appropriately converts the encapsulated multimedia content to a format storable in a storage device or a format transmittable to another entity or a user equipment on a network through the delivery layer.

The delivery layer defines functions for providing a transmission environment optimized for the multimedia content in order to transmit the encapsulated multimedia content through various networks.

The control layer defines consumption information (e.g. electronic program guide (EPG)) required for a user to consume the multimedia content and functions required for the delivery layer to efficiently transmit the multimedia content.

Figure 2:
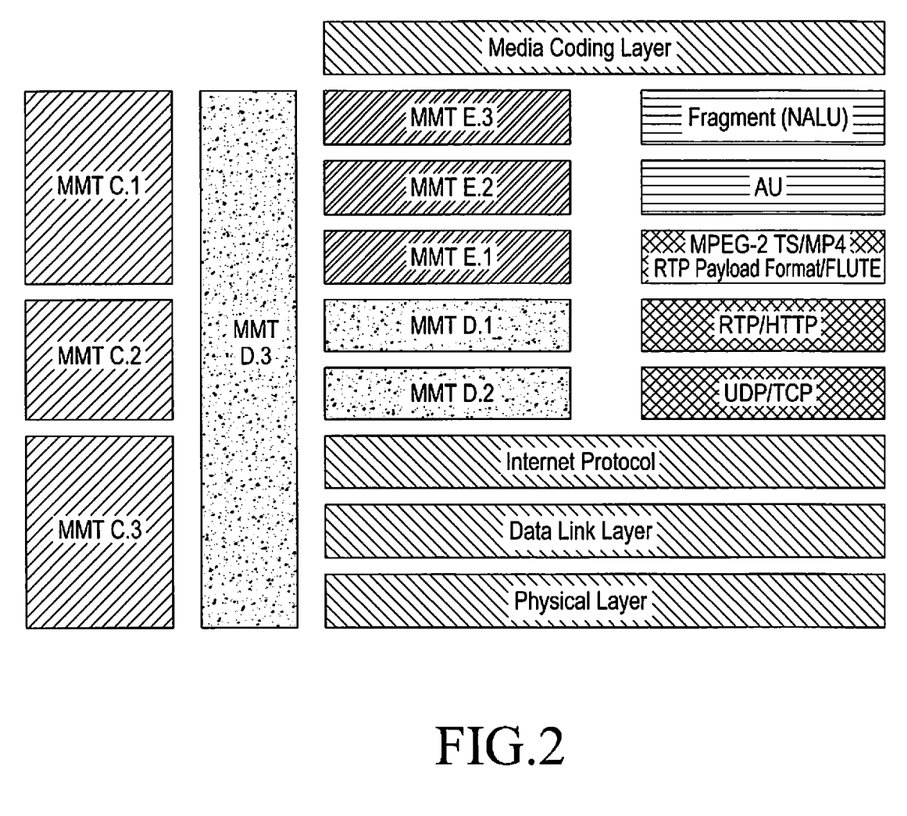
FIG. 2 illustrates three layers subdivided for explaining necessary functions and interfaces in accordance with an embodiment of the present invention.

FIG. 2 illustrates the above three functional layers that are subdivided on a protocol-by-protocol basis according to an embodiment of the present invention.

In the present invention, the encapsulation layer includes three layers of E.1 211, E.2 212, and E.3 213, the delivery layer includes three layers of D.1 221, D.2 222, and D.3 223, and the control layer includes three layers of C.1 231, C.2 232, and C.3 233. In FIG. 2, layers collectively designated by reference numeral "270", that is, fragment NAL unit, AU, MPEG-2 TS, RTP/HTTP, and UDP/TCP are depicted only for the better understanding of the layers according to the present invention, and therefore it should be noted that the functions of the MMT E.3 layer 213, MMT E.2 layer 212, MMT E.1 layer 211, MMT D.1 layer 221, and MMT D.2 layer 222 do not necessarily coincide with those of the fragment NAL unit, AU, MPEG-2 TS, RTP/HTTP, and UDP/TCP layers.

Referring to FIG. 2, the media coding layer 200 generates media data fragments ("fragments") by dividing multimedia content in units of fragments and coding the divided fragments. Further, the media coding layer 200 generates fragment-related information. This fragment-related information is information representing a relation between the generated fragments. For reference, a combination of a given number of fragments constitutes an access unit, and a combination of a given number of access units and access unit-related information constitutes an elementary stream.

The encapsulation layer has the following configurations and functions.

The E.3 layer 213 of the encapsulation layer receives fragments, fragment headers, and fragment-related information from the media coding layer 200, and generates access units by using the received fragments, fragment headers, and fragment-related information. Further, the E.1 layer 213 generates access unit-related information that is information on a relation between the generated access units.

The access unit-related information refers to, for example, a decoding time, a composition time, a size, an access sequence number, and the like. The generated access units and access unit-related information are transferred to the E.2 layer 212. For reference, the fragment may be all types of data by which to compose a multimedia content, such as data output from a voice codec, data output from a video codec, scene composition information for supporting rich media capable of additional functions compared to existing media video, various applications, and file data.

The E.2 layer 212 generates elementary streams by combining a plurality of access units and access unit-related information. Further, the E.2 layer 212 generates elementary stream-related information. The elementary stream-related information refers to, for example, the type of a stream, a stream identifier, the transmission characteristic value of a stream, and the like.

The E.1 layer 211 generates composition information for a multimedia content including the elementary streams and a representative transmission characteristic value allowing the multimedia content to be appropriately consumed. The composition information may be, for example, information necessary when video data and audio data are combined in order to reproduce a multimedia content including the video data and the audio data, and the representative transmission characteristic value may be, for example, a QoS (Quality of Service) that can be expressed by a transmission error rate, speed, and the like.

The delivery layer has the following configurations and functions.

The D.1 layer 221, which corresponds to a transmission protocol similar to the existing RTP or HTTP transmission protocol for multimedia data transmission in the conventional protocol structure of FIG. 1, is an application protocol newly provided by the present invention. In order to efficiently transmit multimedia content, the D.1 layer 221 generates network information necessary for multimedia transmission and information on characteristics of the multimedia content.

The D.2 layer 222, which corresponds to a network transmission protocol similar to the existing UDP or TCP protocol of FIG. 1, generates information for performing flow control and error correction functions in consideration of various network types.

The D.3 layer 223 provides functions involved in information transmission between all the layers, as shown in FIG. 2. That is, the D.3 layer 223 enables multimedia content transfer and eventual necessary communication between the layers in order to optimize the generation, transfer, and consumption of a multimedia content. The D.3 layer 223 performs operations for satisfying the Quality of Experience (QoE) of multimedia content, generates information for the these operations, and if necessary, transmits the information to an entity that receives the multimedia content. Further, the D.3 layer 223 allows the multimedia content to satisfy its QoS in the delivery layer, and to this end, performs communication with all the layers of FIG. 2.

The control layer has the following configurations and functions. The control layer is divided into three layers according to target layers for control.

The C.1 layer 231 generates information necessary for the transfer and consumption of multimedia content by using information generated in the encapsulation layer E.1 211, E.2 212, E.3 213, and provides the generated information to a user equipment. The information necessary for the transfer and consumption of multimedia content refers to, for example, information necessary for content consumption, such as the types of content constituting the multimedia, a relation between the content, and the consumption order of the content, and discovery information through which the multimedia content can be discovered.

The C.2 layer 232 provides the D.1 layer 221 and the D.2 layer 222 with control functions necessary for media transmission. For example, the C.2 layer 232 controls the D.1 layer 221 to perform frame configuration considering the multimedia content. With regard to this, the C.2 layer 232 performs control for the D.1 layer 221 in consideration of the case where the multimedia content is transmitted through various networks. Further, the C.2 layer 232 provides the D.2 layer 222 with the flow control of a session for transmitting a multimedia content.

The C.3 layer 233 accesses and controls layers lower than the delivery layer, that is, an IP (Internet Protocol) layer 240, a data link layer 250, or a physical layer 260. For example, the C.3 layer 233 receives network transmission delay measurement information from the data link layer 250, and allows the delivery layer to appropriately transmit multimedia content by using the received information. Further, the C.3 layer 233 may receive transmission error rate information from the physical layer 260, and perform appropriate control necessary to reduce the transmission error rate. An example of the control for reducing the transmission error rate may be instructions to retransmit a transmitted packet where an error occurs.

Figure 3:
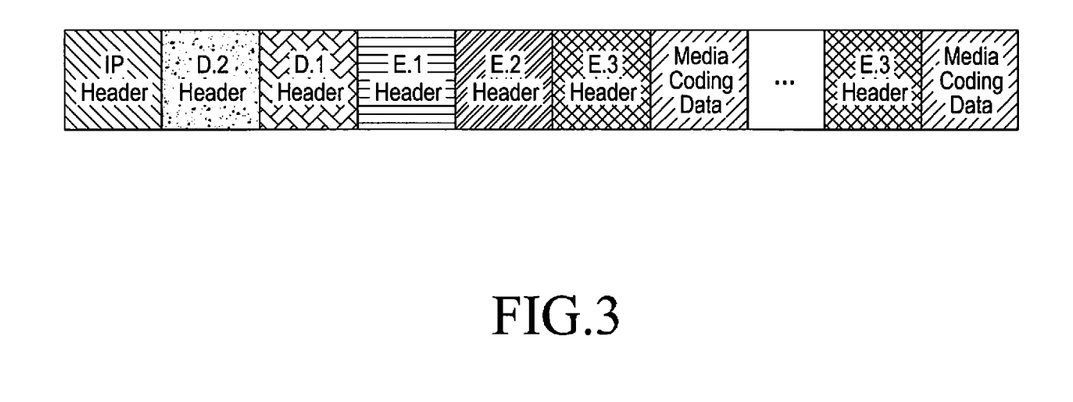
FIG. 3 illustrates a structure of an IP packet of multimedia transmitted using MMT with a structure as shown in FIG. 2.

FIG. 3 illustrates a structure of an IP packet of multimedia transmitted using an MPEG Media Transport (MMT) interface with a structure as shown in FIG. 2.

The information required to operate each layer in FIG. 2 is included in each corresponding layer head constituting the payload of the IP packet 300 of FIG. 3. In FIG. 3, the IP packet 300 includes an IP header 301 and a payload 310. The payload 310 includes each layer header in which the information generated in each of the above-mentioned layers is included.

More specially, media coded data generated in the media coding layer is included in the E.3 layer payloads 307, 309 in units of access units. The E3 layer headers 306, 308 include access unit-related information generated in the corresponding layers, the E.2 layer header 305 includes elementary stream-relayed information generated in the corresponding layer, and the E.1 layer header 304 includes composition information and a representative transmission characteristic value generated in the corresponding layer. In addition, the D.1 layer header 303 includes information on the characteristics of the multimedia content, which is generated in the corresponding layer, and the D.2 layer header 302 includes information for flow control and error correction.

In the present invention, since necessary information is transferred using the IP packet structure shown in FIG. 3, a network entity supporting a specific layer can acquire information necessary for functions which are to be performed in the corresponding layer, from the corresponding layer header without accessing its payload.

Figure 4:
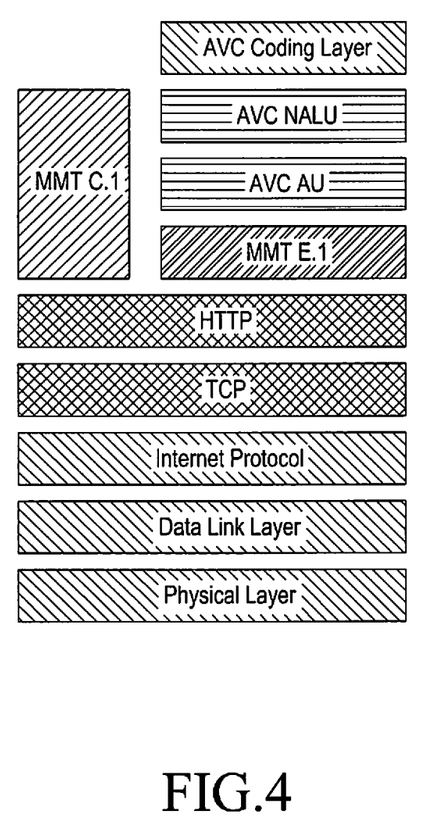
FIG. 4 illustrates an example of actually providing a user with a service by using an MMT system as defined in FIG. 2.

FIG. 4 illustrates an example of actually providing a user with a service by using an MMT system according to an embodiment of the present invention.

This example of FIG. 4 corresponds to an example of providing a service for transmitting advanced video codec (AVC) data on an HTTP protocol, and shows the case where the service can be provided using only the E.1 layer 411 and the C.1 layer 431. In this way, the present invention makes it possible to provide a service by using only some of the layers defined in FIG. 2 to provide a user with the corresponding service.

Figure 5:
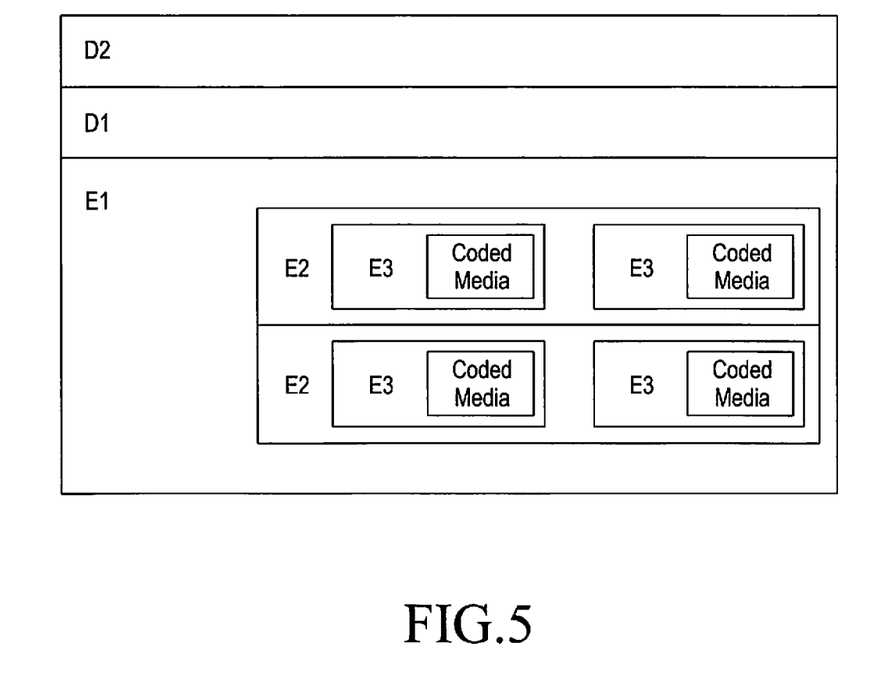
FIG. 5 illustrates a service in the form of a transmission file format, which is transmitted using a multimedia system with a structure as shown in FIG. 2.

FIG. 5 illustrates a service in the form of a transmission file format, which is transmitted using a multimedia system according to an embodiment of the present invention.

In the E.3 layer 513, coded media data 514 is defragmented in units of access units. This is shown by the E.3 boxes in FIG. 5.

The E.3 layer data is stored in the E.2 layer 512, and the E.1 layer 511 includes composition information for multimedia content, which is information necessary for the D and C layers to read information related to a service or session including elementary streams and provide it as a service, and a representative transmission characteristic value allowing the multimedia content to be appropriately consumed. Since a user may access a multimedia service from any point of time after the corresponding multimedia service is initiated, as is the case where a user turns on a TV terminal in the middle of providing the corresponding multimedia service, the composition information and the representative transmission characteristic value need to be repeatedly expressed.

Among layers lower than the E.1 layer 511, the D.1 layer 521 includes network information necessary for transmission of a corresponding packet and information on the characteristics of a corresponding multimedia content, and the D.2 layer 522 includes network information necessary for transmission using the IP layer and information for flow control and error correction.

Figure 6:
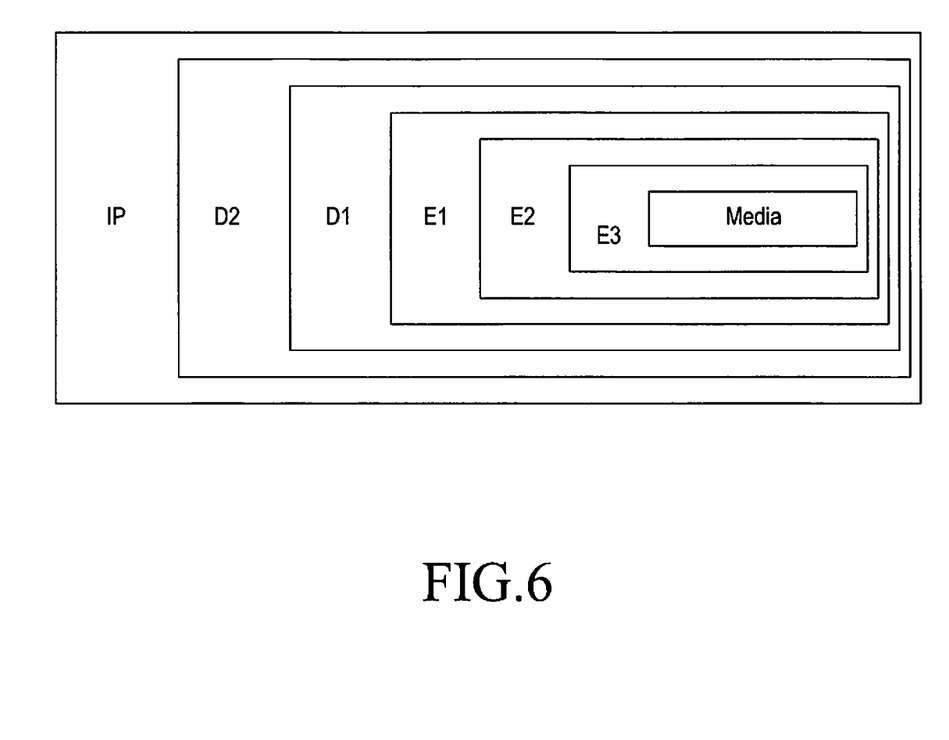
FIG. 6 illustrates a packet structure of a content transmitted using a multimedia system with a structure as shown in FIG. 2.

FIG. 6 illustrates a packet structure of media content data transmitted using a multimedia system according to an embodiment of the present invention.

In FIG. 6, a media slice 601 sliced to an appropriate size according to the type and attribute of content data is packetized as the payload of an E.3 packet 602. Further, the E.3 packet 602 is packetized by an E.2 packet 603 while being divided in units of access units. Further, the E.2 packet 603 is packetized by an E.1 packet 604 while being divided in units of elementary streams. The E.1 packet 604, together with information for transmission using the TCP or UDP layer and information on the characteristics of a multimedia content, is packetized by a D.1 packet 605. The D.1 packet 605, together with information necessary for transmission using the IP layer and information for flow control and error correction, is packetized by a D.2 packet 606. Finally, the D.2 packet 606 is packetized by a conventional IP packet 607.

According to the present invention as described above, various multimedia content can be optimally transmitted at a minimized cost by using a converged framework. Accordingly, since not only can a user be efficiently provided with multimedia-related content, but providers of the multimedia content can also provide services through one converged system, efficiency and flexibility in providing the services can be improved.

While the invention has been shown and described with reference to certain embodiments thereof, it will be understood by those skilled in the art that various changes in form and details may be made therein without departing from the spirit and scope of the invention as defined by the appended claims.

What is claimed is:

1. An interface for providing a media service, the interface comprising:
    an encapsulation layer for encapsulating coded media data;
    a delivery layer for transmitting the encapsulated media data to another entity; and
    a control layer for controlling transmission of the media data.

2. The interface as claimed in claim 1, wherein the encapsulation layer comprises:
    an E.3 layer for generating at least one access unit and access unit-related information by using media data fragments and information related to the media data fragments, received from a media coding layer;
    an E.2 layer for generating at least one elementary stream and elementary stream-related information by using the at least one access unit and the access-unit-related information; and an E.1 layer for generating composition information for multimedia content including the at least one elementary stream and a representative transmission characteristic value necessary for consumption of the multimedia content by using the at least elementary stream and the elementary stream-related information.

3. The interface as claimed in claim 2, wherein the media data fragments are included in a payload of a packet of the E.3 layer, and the information related to the media data fragments is included in a header of the packet of the E.3 layer.

4. The interface as claimed in claim 2, wherein the packet of the E.3 layer is included in a payload of a packet of the E.2 layer in units of access units, and the elementary stream-related information is included in a header of the packet of the E.2 layer.

5. The interface as claimed in claim 2, wherein the packet of the E.2 layer is included in a payload of a packet of the E.1 layer in units of elementary streams, and the composition information and the representative transmission characteristic value are included in a header of the packet of the E.1 layer.

6. The interface as claimed in claim 2,
wherein the delivery layer comprises:
 a D.1 layer for generating network information necessary for transmission of the media data and information on characteristics of the media data;
 a D.2 layer for generating information necessary for flow control and error correction for transmission of the media data;
 a D.3 layer for performing information transmission between the layers constituting the interface; and
wherein the packet of the E.1 layer is included in a payload of a packet of the D.1 layer, and the network information necessary for transmission of the media data and the information of characteristics of the media data are included in a header of the packet of the D.1 layer.

7. The interface as claimed in claim 6, wherein the packet of the D.1 layer is included in a payload of a packet of the D.2 layer, and the information necessary for flow control and error correction is included in a header of the packet of the D.2 layer.

8. The interface as claimed in claim 6, wherein the packet of the D.2 layer is included in a payload of an IP packet.

9. The interface as claimed in claim 1, wherein the delivery layer comprises:
 a D.1 layer for generating network information necessary for transmission of the media data and information on characteristics of the media data;
 a D.2 layer for generating information necessary for flow control and error correction for transmission of the media data; and
 a D.3 layer for performing information transmission between the layers constituting the interface.

10. The interface as claimed in claim 9, wherein the control layer further comprises a C.2 layer for performing control for the D.1 and D.2 layers, which is necessary for transmission of the media data.

11. The interface as claimed in claim 1, wherein the control layer comprises a C.1 layer for generating information necessary for transmission and consumption of the media data by using information generated in the encapsulation layer.

12. The interface as claimed in claim 1, wherein the control layer further comprises a C.3 layer for performing control for at least one of layers lower than the delivery layer.

13. The interface as claimed in claim 12, wherein the layers lower than the delivery layer comprise at least one of an IP layer, a data link layer, and a physical layer.

* * * * *